United States Patent
Grenier et al.

(10) Patent No.: US 6,224,796 B1
(45) Date of Patent: May 1, 2001

(54) PROCESS FOR PRODUCING BATCHES OF RUBBER-BASED COMPOSITION

(75) Inventors: Daniel Grenier; Sylvain Bilodeau, both of Sainte-Foy (CA)

(73) Assignee: Centre de Recherche Industrielle du Québec, Sainte-Foy (CA)

( * ) Notice: Subject to any disclaimer, the term of this patent is extended or adjusted under 35 U.S.C. 154(b) by 0 days.

(21) Appl. No.: 09/149,859

(22) Filed: Sep. 9, 1998

(51) Int. Cl.⁷ .............................. B29B 7/16; B29C 43/58
(52) U.S. Cl. ............................... 264/40.6; 264/349
(58) Field of Search .................................... 264/40.6, 349

(56) References Cited

U.S. PATENT DOCUMENTS

| | | |
|---|---|---|
| 3,489,710 | 1/1970 | Bonotto et al. . |
| 4,257,925 | 3/1981 | Freeguard . |
| 4,272,474 | 6/1981 | Crocker . |
| 4,332,479 | 6/1982 | Crocker et al. . |
| 4,451,593 | 5/1984 | Nicholakopoulos et al. . |
| 4,481,335 | 11/1984 | Stark, Jr. . |
| 5,425,904 | 6/1995 | Smits . |
| 5,510,419 | 4/1996 | Burgoyne et al. . |

FOREIGN PATENT DOCUMENTS

| | | |
|---|---|---|
| 275 003 | 7/1988 | (EP) . |
| 0 675 263 | 6/1995 | (EP) . |

Primary Examiner—Leo B. Tentoni
(74) Attorney, Agent, or Firm—Swabey Ogilvy Renault

(57) ABSTRACT

Processes for the batch production of rubber-based compositions capable of being shaped and shaped articles made thereof. They include a step of high intensity mixing cured rubber particles with other selected compounds into a closed mixing chamber provided on a high intensity mixer including a central shaft having mixing blades. Through high speed rotation of the shaft, blade tip speed above about 20 meter/s are obtained to intensively mix and thermokinetically heat the batch of mixable material, whose temperature is continuously monitored. Discharge of the batch from the mixing chamber takes place when the temperature is considered to have reached a reference value ensuring a substantially uniform mix of the rubber material and added compounds, to produce the rubber-based composition. According to a first preferred embodiment, cured rubber is fed into the mixing chamber with a resinous material, and discharge occurs at a temperature ensuring a substantially uniform mix of the rubber material in a matrix of resinous material to produce the rubber-based composition, which can be then shaped without any further heating. According to a second preferred embodiment, a curing agent is added to the cured rubber particles, and the batch is discharged from the mixing chamber when the temperature reaches a reference value ensuring a substantially uniform mix of the cured rubber material with the curing agent without causing a significant further curing, to produce a rubber-based composition capable of being heat-shaped. Other preferred embodiments using a reactive polymeric binding agent and a bonding agent are described.

18 Claims, 3 Drawing Sheets

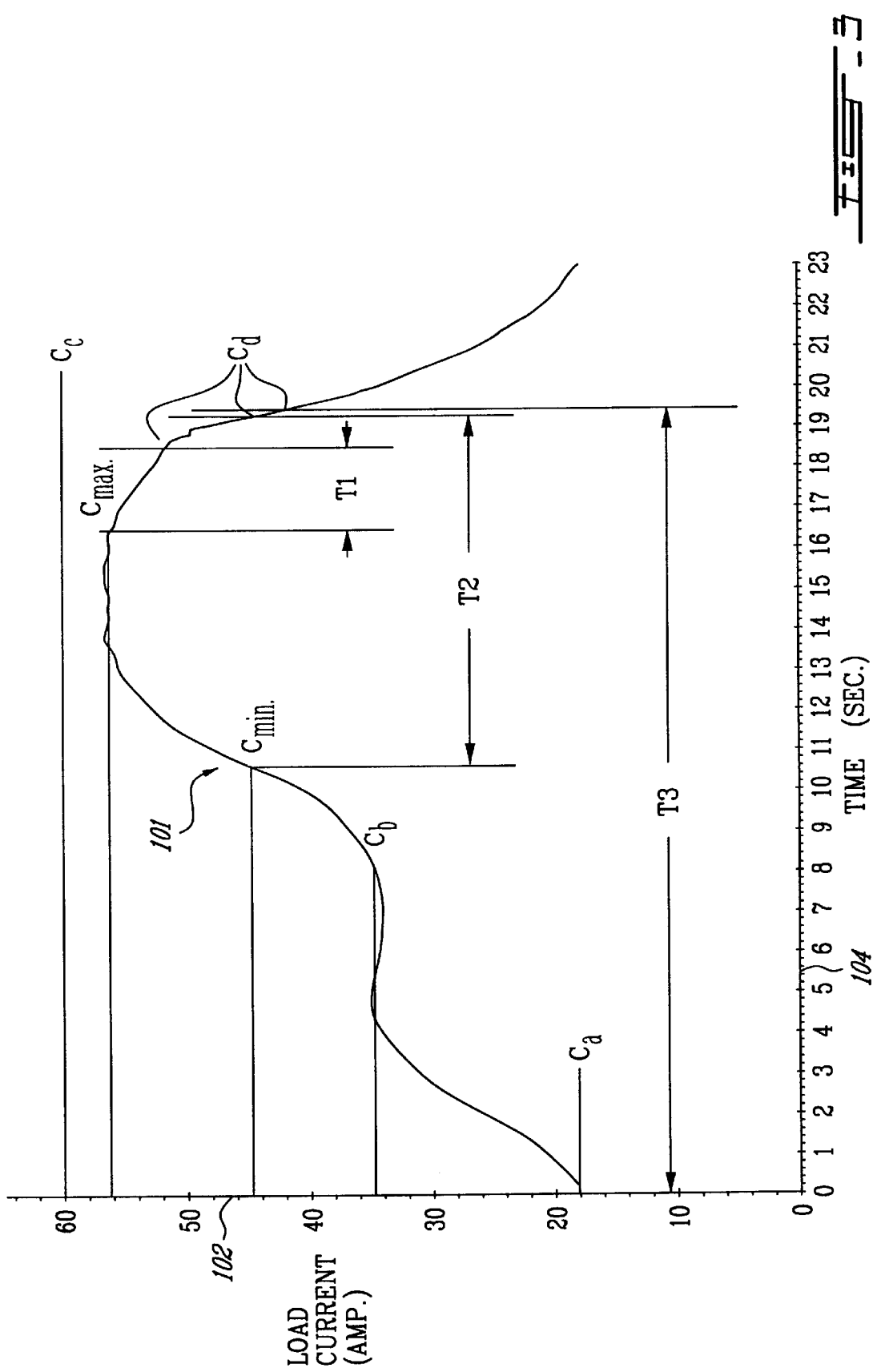

PROCESS FOR PRODUCING BATCHES OF RUBBER-BASED COMPOSITION

BACKGROUND OF INVENTION (a) Field of Invention

The present invention relates to processes for producing batches of rubber-based composition and articles made thereof, and more particularly to processes for producing batches of rubber-based composition and shaped made thereof.

(b) Description of Prior Art

Since the creation of the rubber industry over more than a century ago, rubber materials have been essentially produced through processes based on dienes vulcanization. In the early stages, dienes-based materials were produced through plant-latex obtained from particular tropical trees such as Para rubber-plant (Hevea). Synthetic rubbers have first been introduced during the second world war to obviate a shortage in natural rubber supply. Dienes-based rubbers, either natural or synthetic, are made of macromolecular compounds exhibiting significant flowing characteristic under tensile stress. Actually, such basic materials do not present great interest for industrial applications. To prevent macromolecular slipping for the purpose of providing a material capable of sustaining deformation while recovering its initial state after stressing, blocking of the macromolecular chains to one another is required. Such molecular chains blocking is obtained through a process known as vulcanization or curing, which typically consists of cross-linking macromolecular chains at double bond sites which are present along the chains, using sulfur as the linking element or an organic peroxide. Typically, curing occurs through heating diene-based rubber materials at a temperature between about 130° C. to 150° C. in the presence of about 7–10% of sulfur. Mechanical properties of sulfur-cured rubbers vary with cross-linking density which is proportional to the initial sulfur concentration. In practice, compositions of various virgin (uncured) rubber types, such as natural rubber, butyl rubber, polybutadiene and neoprene, with specific additives such as curing starting agents and curing accelerators, have been developed to obtain, after curing, rubber-based material exhibiting various mechanical properties such as tensile strength, maximum tensile elongation, tear strength, embrittlement temperature and resilience.

During the past years, due to the generally high cost of uncured rubbers, reclaimed cured rubber in the form of particles or dust has been used as raw material to form a variety of manufactured articles. Essentially, the technique usually consists of mixing rubber particles with 1%–5% sulfur and curing the obtained mix in a suitable mold heated at a temperature of about 180° C. while applying a pressure between 500 pound/sq.in. to 2000 pound/sq.in. with a conventional hydraulic press. Processes using such technique are generally known to be more cost effective than processes using uncured rubber as raw material, which is significantly more expensive than reclaimed rubber. However, the mechanical properties exhibited by such reclaimed materials are generally inferior, typically characterized by a maximum tensile strength of about 300 pound/sq.in., a maximum tensile elongation of about 50%, and maximum tear strength of about 100 pound/in., which properties are significantly inferior than those exhibited by uncured rubber-based compositions. Such inferior mechanical behavior is mainly due to porosity characteristics and cross-linking level. Materials made of rubber particles or dust are characterized by a porosity which is generally responsible for the appearance of microfissures under mechanical strength. Furthermore, effective contact areas between adjacent particles of a reclaimed rubber material are reduced as compared to those observed in virgin raw material. Under such conditions, cross-linking between macromolecules of adjacent particles are reduced accordingly, since most free double links of adjacent particles are not in sufficiently close proximity to be bound, and accordingly the non-reacted curing agent rapidly becomes in excess. Microfissures appearing within the rubber material initiate flaws therein which rapidly grow toward material rupture, due to the weakness of internal forces binding rubber particles together, observed at low cross-linking level.

A known technique to reduce the inherent porosity of a material made of reclaimed rubber particles consists in adding a resin, preferably a thermoplastic resin, to bind the rubber particles and therefore reduce porosity. A certain amount of uncured rubber material can also be added to increase the number of free double bond available for curing. Additives such as compatibility agents may also be added. The resultant composition is used to produce rubber materials which have been found to exhibit improved mechanical properties in the range of 400 pound/sq.in. for tensile strength, 250% for maximum tensile elongation and 180 pound/in for maximum tear strength. However, such improved reclaimed rubber materials still exhibit lower mechanical properties as compared to materials essentially made of virgin rubber, since the cross-linking level remains substantially unchanged when a thermoplastic binding resin is used, and because the electrostatic forces acting between rubber particles and thermoplastic resin are also weak. Such an improved technique is disclosed in U.S. Pat. No. 5,510,419 issued Apr. 13, 1996, to Burgoyne et al., and it teaches to produce a polymer-modified rubber composition comprising reclaimed cured styrene-butadiene rubber particles, uncured rubber, a styrene-based thermoplastic resin, a homogenizing agent, to form a blend wherein the thermoplastic resin is substantially homogeneously mixed with the cured and uncured rubbers. Additives including plasticizers, lubricants, mold release agent or viscosity modifiers such as trans-polyoctanamer rubber may also be added. Use of a batch mixer such as the well known Moriyama or Bandbury high intensity mixers is proposed to produce a moldable composition showing a temperature between 120° C. and 150° C., which is then transferred to a mold which is preheated at a temperature above a vulcanizing temperature of about 120° C. Another similar process is disclosed in U.S. Pat. No. 5,425,904 issued Jun. 20, 1995, to Smits, which uses rubber latex to treat cured waste rubber particles with a curing agent to produce an activated moldable composition. Another similar approach is taught in U.S. Pat. No. 4,257,925 issued Mar. 24, 1981, to Freeguard, which consists of swelling reclaimed tire rubber with a monomer and then causing polymerization thereof.

In order to further improve mechanical properties of reclaimed rubber materials, the addition of various reactive cross-linking resin binders to the curing agent has been proposed. In U.S. Pat. No. 3,489,710 issued Jan. 13, 1970, to Bonotto et al., ethylene-based flexible resins reactive with a curing agent such as sulfur are mixed with reclaimed rubber particles in the presence of the curing agent using a high intensity batch mixer such as a Bandbury mixer. Similarly, in U.S. Pat. No. 4,481,335 issued Nov. 6, 1984 to Stark, a liquid sulfur-curable polymeric binder, namely a homopolymer or copolymer of 1,4-butadiene and substituted butadiene, is blended with cured rubber scrap and sulfur to produce a treated rubber material which can be used in large proportion as a filler or extender for uncured rubbers. Although known prior art processes employing reclaimed rubber have heretofore proved to be capable of producing, at lesser cost, shaped rubber-based products of various quality in terms of mechanical properties, in order to be practiced on an industrial basis, these processes generally require the use of large and expensive high intensity mixing equipment, generally limited to long production cycles to provide a composition homogeneity which is required to obtain uniformity of physical properties, which requirement may affect the effective productivity of the process. Furthermore, known processes for mixing curable rubber-based compositions may not provide proper reduction of humidity within a batch to be formed, which may cause dangerous high pressure steam discharge upon removal from the mold. Therefore, there is still a need for a process for producing batches of rubber-based composition and articles made therefrom which overcome the foregoing drawbacks of the prior art.

SUMMARY OF INVENTION

It is therefore an object of the present invention to provide economic and safe processes for the production of moldable rubber-based compositions and shaped products made therefrom, which affords short production cycle for a large range of shaped product quality requirements in terms of mechanical characteristics.

According to the above object, from a broad aspect, there is provided a process for producing a batch of rubber-based composition capable of being formed into an article, comprising the steps of:

- feeding a batch of mixable material comprising from about 40% to about 90% by weight of particles of cured rubber material with from about 60% to about 10% by weight of a resinous material into a closed mixing chamber provided on a high intensity mixer including a central shaft having mixing blades;
- rotating the shaft to provide a blade tip speed of from about 17 meter/s to about 35 meter/s under conditions effective to intensively mix and thermokinetically heat the batch of mixable material;
- continuously monitoring one of temperature and temperature related parameter of the batch;
- discharging the batch from the mixing chamber when said one of temperature and temperature related parameter reaches a reference value ensuring a substantially uniform mix of said rubber material in a matrix of said resinous material to produce said rubber-based composition.

BRIEF DESCRIPTION OF THE DRAWINGS

Preferred embodiments of the present invention will now be explained in detail with reference to the accompanying drawing in which:

FIG. 3 is a graph showing the variation of a mixer motor load current measured as a function of time, and related thresholds used to control a process according to the present invention.

DETAILED DESCRIPTION OF THE PREFERRED EMBODIMENTS

Figure 1:
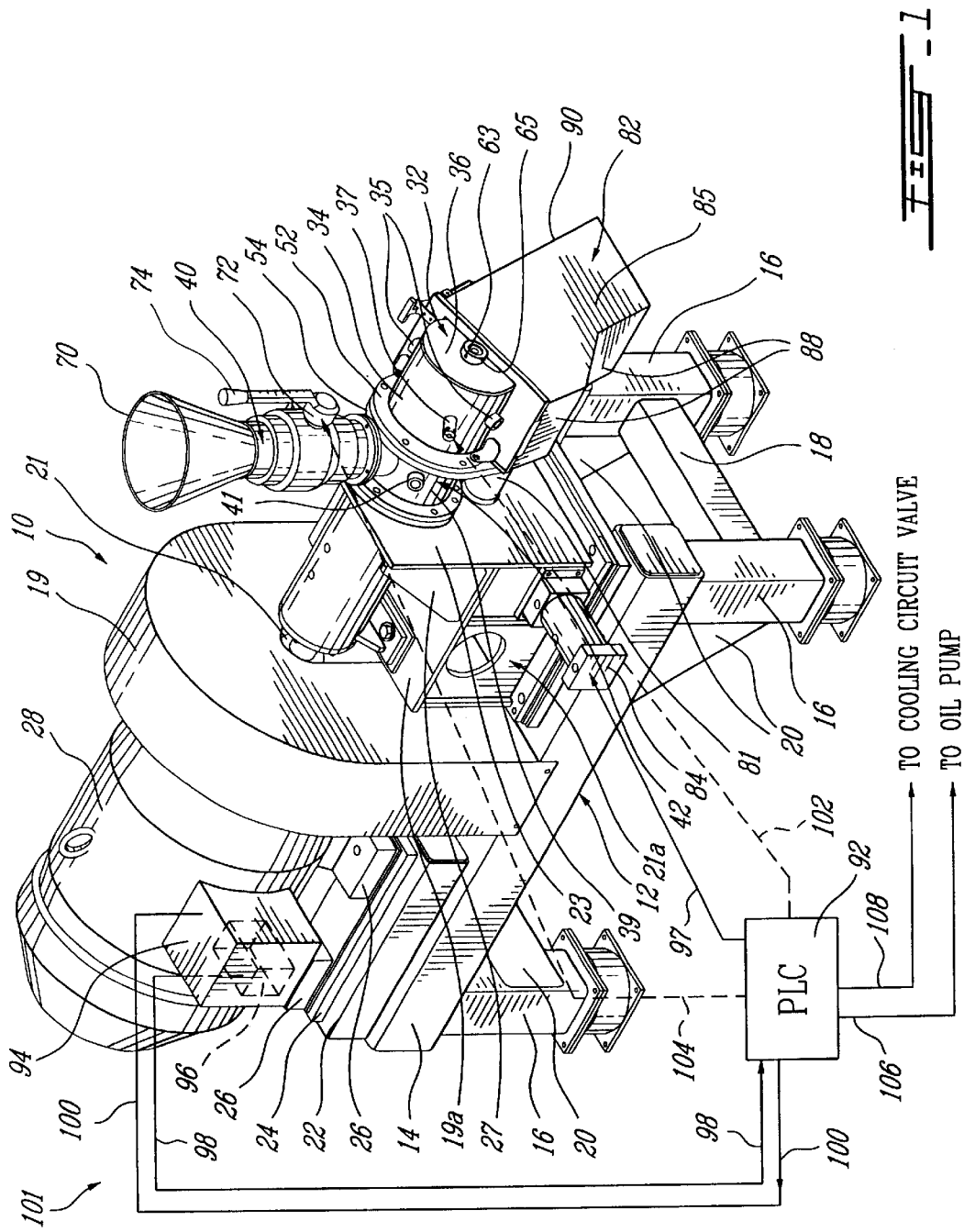
FIG. 1 is a perspective view of a high intensity batch mixer used to practice the process according to the present invention.
Figure 2:
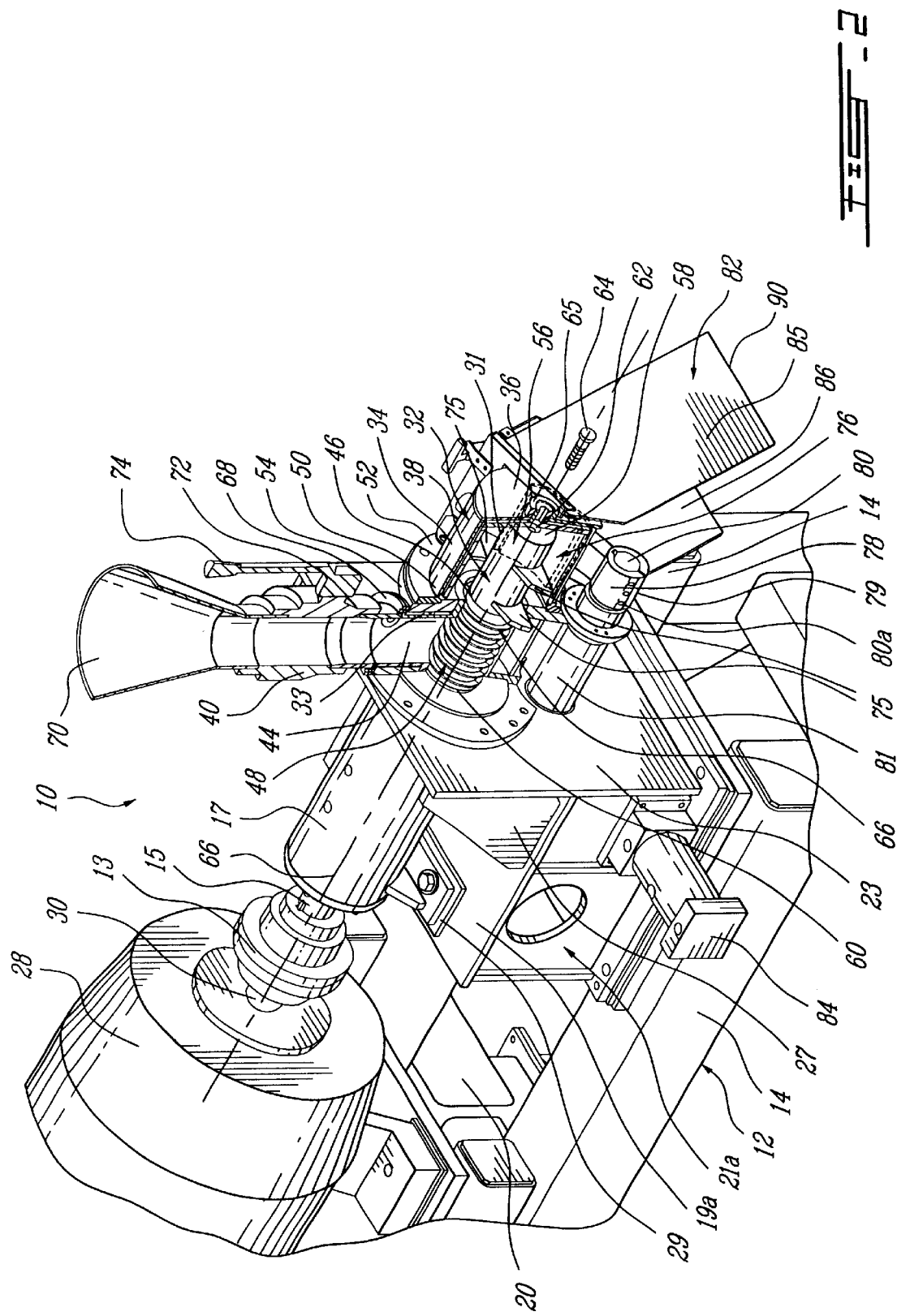
FIG. 2 is a partially cross-sectional perspective view of a front end of the batch mixer shown in FIG. 1.

Referring now to the drawings, a high intensity mixer 10 which could be used to carry out the process according to the present invention is depicted, which mixer 10 comprises a base frame 12 including a pair of longitudinal beams 14 secured to upper ends of front and rear pairs of floor mounted pillars 16 rigidly secured by transverse members 18 and bracing plates 20. On the rear portion of the beams 14 is secured a motor base 22 having a mounting plate 24 on which is secured lower parts of legs 26 supporting an electric industrial motor 28, preferably of a self-cooling type. As shown in FIG. 2, motor 28 is provided with an output shaft 30 connected to a driving end of a flexible coupling 13 of known construction, which has a driven end connected to a driving shaft 15 extending through a cantilever bearing unit 17 permanently lubricated with a pumped oil circuit (not shown). The flexible coupling is covered for protection with a casing 19 (FIG. 1) provided with an aperture 21 giving required clearance for the main driving shaft 15. The cantilever bearing unit 17 is rigidly mounted through rear and front supports 29 (only rear support being shown in FIG. 2) on an horizontal plate 19 as part of a sub-frame assembly 21 secured to the front portions of the beams 14, and having a vertical mounting plate 23 further secured to the horizontal plate 19 through a pair of opposed bracing plates 27.

As shown in FIG. 2, apparatus 10 further comprises a cylindrical mixing chamber 32 having outer double peripheral wall 34 and provided with cooling fluid ports 35 (FIG. 1) to be connected to a cooling circuit line (not shown) as will be later explained in more detail. Wall 34 is further provided with and optional temperature probe 37. Mixing chamber 32 further has a circular double end wall 36 defining a mixing cavity 38. Mixing chamber 32 is secured to the body of a feeding unit 42 having an outer double peripheral wall 39 provided with cooling fluid ports 41 as better shown in FIG. 1, and an input tubular portion 44 in communication with an output annular portion 46 defining a feeding cavity 48 therebetween, as better shown in FIG. 2. The inner edge of peripheral double wall 34 of the mixing chamber 32 defines an annular channel adapted to receive an annular rib protruding from the outer surface of a first collar 52, which is then rigidly welded or otherwise secured to the double wall 34. The inner surface of first collar 52 is in turn joined to the outer mating surface of a second collar 54. Collars 52 and 54 are rigidly bolted together. Output annular portion 46 of the feeding unit 42 tightly engages with an inner opening formed in collar 54, to form an annular inner end wall opposed to circular end wall 36. Input tubular portion 44 defines with the inner rear surface of collar 54 an internal space 33 in fluid communication through a fluid line (not shown) with internal space 31 within double walls 34 and 36, to form a cooling cavity as part of the cooling fluid circuit filled with a cooling fluid such as cold water, for limiting the temperature of the feeding cavity and mixing chamber to a level providing desired process continuity.

Centrally extending through the output annular portion 46 is a two-part driven shaft 56 having a forward bladed portion 58 contained in the mixing chamber 32 and being opposed to a rearward threaded portion 60 contained in the feeding cavity 48 and acting as a conveyor screw. The cantilever bearing unit 17 provides axial and radial stability for shaft 56 while allowing rotation thereof about axis 66. Rearward shaft portion 60 is rigidly secured to the driven end of the driving shaft 15 using a key screw (not shown), to impart rotation to the rearward shaft portion 60. The outer end of forward shaft portion 58 is formed with a threaded hole 62 for receiving an aligned bolt 64 securing the forward shaft portion 58 to the driven end of the driving shaft 15, to impart rotation to the forward shaft portion 58. An optional aeration port 65 is provided at the outer surface of double end wall 36. Alternatively, instead of using a cantilever arrangement, port 65 may be replaced by a bearing for receiving a rotating rod (not shown) to be secured to the outer end of the forward shaft portion 58. The outer diameter of threads 66 provided on the driven shaft 56 is chosen to closely fit within output annular portion 46, mixing cavity 38 thereby becoming substantially enclosed. Input tubular portion 44 of feeding unit 42 is coupled with a corresponding lower flange 68 of a feeding column 40 provided with a feeding hopper 70 at an upper portion thereof. In the example shown, a feeding door mechanism 72 provided with a hand-held actuating arm 74 allows an operator to dump raw materials previously discharged in the hopper into feeding cavity 48. Radially extending from the surface of the forward shaft portion 58 are a plurality of mixing blades 75 each having a tip portion maintained in substantially close proximity to the inner surface of the double wall 34. Located in a lower portion of the peripheral double wall 34 is a discharge opening 76 delimited by a peripheral sealing edge surface adapted to tightly mate with the corresponding inner surface of a displaceable door 78. Door 78 is rigidly secured to an outer end of a pivoting arm 77 having an inner end rigidly attached to a clamping sleeve 79 receiving an output shaft 80 of a rotary actuator 81 mounted on the sub-frame assembly 21 and being driven through a pneumatic cylinder 84 coupled to a linear-to-rotary converting mechanism of a known construction (not shown). Using set screws 80a, the output shaft 80 is caused to rigidly engage the clamping sleeve, to selectively displace the door away from a discharge opening 76 to provide discharge of mixed material out of the mixing chamber upon rotation of the shaft in a first direction, or to displace the door toward discharge opening 76 and maintain door 78 against it in an opposite direction to tightly obstruct the opening 76 during the feeding and mixing steps. To cover the discharge area there is provided a chute 82, which comprises front and rear wall 85, 86 as better shown in FIG. 2 and side walls 88, 90 as better shown in FIG. 1, which walls define a discharge outlet for dumping a mixed batch to be transferred to a forming station.

Apparatus 10 further comprises a control device such as parogrammable logic controller (PLC) 92 which receives from line 98 a current load indicating signal generated by an electrical current measuring device such as ammeter 96 as part of the motor drive unit 94, or located at a remote location, to derive the estimated temperature of the mix, as will be explained later in more detail. Alternatively, the PLC may receive via line 102 and optional temperature probe 37, a signal representing the temperature directly measured within mixing cavity 38. Due to the generally short time cycle of the process, the temperature within the batch of material being mixed could be significantly different from the temperature of walls 34 or 36 of mixing chamber 32. Therefore, a remote temperature sensor should preferably be used, such as optical infrared sensor as disclosed in U.S. Pat. No. 4,332,479 issued Jun. 1, 1882, to Crocker et al. PLC 92 also sends to motor drive unit 94 through line 100, a command signal to control the rotation of motor 28 according to a preset RPM value. The motor drive unit 94 incorporates a feedback device to substantially maintain the preset RPM, whatever the load current variation may be. PLC 92 sends a command signal to pneumatic cylinder 84 via line 97 according to a selected predetermined program stored in the PLC, as will be discussed later in more detail. It should be understood that discharge can also be manually operated a through manual control mode available on the PLC. Lines 106 and 108 are used to send control signals to a lubricating oil pump for bearing unit 17 and a valve (not shown) which controls the cooling circuit. Optionally, the hand-held arm 74 of the feeding door mechanism 72 can be replaced by a rotary actuator which can be coupled to the feeding door mechanism and activated through the PLC via line 104.

The principles underlying the process according to the present invention will now be explained with reference to the operation of the apparatus described above with respect to FIGS. 1 and 2, and also in conjunction with FIG. 3. Mixing and heating of the raw material present in mixing cavity 38 of mixing chamber 32 are simultaneously achieved as a result of the high speed of blades 75 obtained by rotation of shaft 56. Under centrifugal forces resulting from the rotation of the blades, particles of material are violently projected against the inner surface of the peripheral wall 34 and the shaft or against one another, such friction converting kinetic energy into thermal energy resulting in material temperature increase at a fast rate toward a target maximum temperature, typically within 30 to 60 seconds for a target temperature above 180° C., without any need for further extraneous heat source. The rotation speed in RPM of shaft 56 is preset to a value ensuring that sufficient mixing and friction energy is provided to the mix, in a short processing time while still providing the stability required for efficient process control. The composition homogeneity which is required to obtain uniform physical properties is also obtained. Such results can be obtained when the blade tip speed is above about 17 meter/sec, and preferably between about 25 and 30 meter/sec. Experience has shown that with blade tip speeds above 35 meter/sec, a fast temperature rising rate observed may render the process difficult to control. Since the blade tip speed is directly related to the RPM value as a tangential speed at the corresponding radius, the RPM as a standard parameter, is preferably chosen as a reference control parameter for the process. To substantially maintain a preset RPM, electrical power or energy required will depend on the inherent properties of the formulation such as volume of the batch, density and viscosity of the material, as well as characteristics of the mixer such as mixing cavity radial section and volume, design of shaft 56 and configurations of blades 75, torque requirement without load, etc. While the latter characteristics can be considered as substantially constant, the parameters characterizing properties of the material to be mixed such as density and viscosity vary during the mixing process, altering load current or energy required to maintain a preset RPM.

Referring now to FIGS. 2 and 3, the process control according to a preferred embodiment of the present invention will be explained through a series of examples, wherein a load current measurement to monitor the temperature of the batch material under mixing is used.

EXAMPLE 1

Referring to FIG. 3, curve 101 which is shown, represents the variation of load current (in amp) shown on vertical reference axis 102, and as a function of time (in sec.) on horizontal reference axis 104, measured during mixing of a 1 kg batch of material, from the initial material feeding step to a final state where the 3 liter mixing chamber 32 of the high intensity mixer 10 is empty after discharge of the mixed batch. In this example, 63% by weight of vulcanized (cured) rubber crumb of either natural or synthetic type were previously pre-mixed with 32% of a thermoplastic polymer resin, selected from polyethylenes (from low to high density) or ethyl-vinyl acetates, optionally with 5% by weight of an additive such as acrylic acid. The rubber crumbs were selected to pass through a 8 mesh sieve in the instant example. However, depending on the raw rubber crumb grain size and desired composition quality, any sieve size between 8 to 60 mesh, and preferably between about 20 to 30 mesh may be used. Depending on the desired mechanical properties for the formed material, experience has shown that from about 40% to about 90% by weight of cured rubber crumbs may be added to from about 60 to about 10% by weight of thermoplastic resin. Before feeding the raw material into feeding cavity 48 upon activation of feeding door mechanism 72, the load current drawn by motor 28 running idle at a preset speed of about 3200 RPM was measured to be about 15 amp. For the composition of this example, the rotation speed of shaft 56 may be typically set from about 2800 to about 3600 RPM, which limit values correspond to a blade tip speed from about 22 to 29 meter/s, respectively. Once the material is introduced, friction of the material carried along the path of feed thread 66 upon rotation of shaft 56, creates a counter-torque producing an initial increase of the load current which rises to a preset feeding value of about 19 amp in the example shown, which roughly corresponds to an effective introduction of the material into mixing cavity 38. Conveniently, the timing of the process was chosen to begin as the measured load current reaches, associated with an initial temperature for the input material which generally corresponds to ambient storage temperature. Thereafter, the intensity of the load current increases according to a first substantially linear gradient until the whole batch of material has been introduced within the mixing cavity 38, which corresponds to a substantially flat intermediate curve part showing an average load current value of about 35 amp in the example shown. That temporary load current stability is associated with a constant mixing behavior exhibited by the batch material as the temperature is rising toward a first transition temperature where the material enters into a viscous state progressively adding to counter-torque, requiring further increase of the load current above to maintain the RPM at the preset level of 3200. The increase in viscosity is associated with a melting of the thermoplastic resin which encapsulates the rubber crumbs which remain in a solid state at that temperature range. In the example shown, the transition temperature was obtained in about 9 sec. Then, the load current rises according to a second substantially linear gradient, passing through a minimum value the purpose of which will be explained later, to substantially stabilize at a maximum level of about 56 amp in about 15 sec for the example shown, which maximum corresponds to a second transition temperature where the mixed material gradually enters into a fluidized state requiring less energy to be mixed. Thereafter, the load current begins to drop accordingly, while the temperature of the fluidized matter still increases, until the desired batch temperature is considered to have been reached, corresponding to a predetermined discharge load current, which parameter can be derived in various ways. A first way consists in causing PLC 92 to open discharge door 78 for a preset time following the moment where the load current reaches through a numerical analysis method programmed in PLC 92. It should be understood that can be set at zero. The preset value for can be chosen experimentally by a direct measurement of the temperature of the discharge material using successive test values for. In the example shown in FIG. 3, was given a value of 2 sec. An alternate way would consist in programming PLC 92 to open the discharge door 78 for a preset time following the moment where the load current reaches, both current values being experimentally set while ensuring that the derived has a value equal to or under. In the example shown in FIG. 3, was given a value of 8 sec, to correspond to a target discharge temperature for the mixed matter, of about 170° C. For the composition of this example, a target temperature within a range from about 160° C. to about 190° C. ensures the production of a substantially uniform mix of cured rubber material in a matrix of resinous material to produce a rubber-based composition which could be later formed into an article. A third way would consist in causing PLC 92 to open discharge door 78 for a preset time following the start of the mixing, which corresponds to. In the example shown in FIG. 3, was given a value of 19 sec. It should be understood that any combination of the foregoing conditions for discharge control can be used alternatively, whichever is met first. It should also be understood that any other practical way using any other appropriate temperature-related parameter can be used to control batch discharge after mixing. Optionally, the material discharge may be caused to occurs in case where the load current as measured reaches a predetermined critical value, indicating a possible malfunction of the apparatus. As mentioned before, the mixed matter discharge can also be under the control of the operator using manual functions available on PLC 92, based on manual timing carried out after the introduction of the material into feeding cavity 48. If the process control is based on direct temperature measurement through temperature probe 37 as shown in FIG. 1 rather than being indirectly based on load current measurement, PLC 92 can be programmed to monitor a temperature signal coming from probe 37, and to command activation of discharge door 78 whenever a target discharge temperature is measured. The discharged material which was in a viscous state was then ready to be transferred to a shaping station to be shaped into an article. For a rubber-thermoplastic composition used in the example described with reference to FIG. 3, a conventional cold-molding press on which is mounted a two-part mold was used to form the article, the latter being allowed to cool into the mold under pressure until mold removal temperature was attained.

EXAMPLE 2

In this example, from about 90% and 99% by weight of cured rubber crumbs of either natural or synthetic type were previously pre-mixed with from about 10% to 1% of a curing agent such as sulfur, which is characterized by a minimum curing temperature of about 110° C., and then introduced into 3 liter mixing chamber 32 of high intensity mixer 10. The rubber crumbs were selected to pass through a 8 mesh sieve in the instant example. For the composition of this example, the rotation speed of shaft 56 may be set from about 2200 to about 3600 RPM, which limit values correspond to a blade tip speed from about 17 to 29 meter/s, respectively. PLC 92 was programmed to monitor the temperature as previously explained, to command activation of discharge door 78 whenever a target discharge temperature was considered to have been reached, corresponding to a temperature for the mixed matter selected within a range from about 115° C. to about 140° C., ensuring the production of a substantially uniform mix of cured rubber with the curing agent without causing significant further curing to produce a rubber-based composition which could be later heat-shaped into an article.

Typically, the mixing cycle is completed within about 30 sec. The discharged composition in the form of a mass of hot particles was then ready to be transferred to a shaping station to be shaped into an article, the mold being pre-heated to a molding temperature substantially above a minimum curing temperature. The batch of heat-moldable composition is maintained within the pre-heated mold for a sufficient period of time to allow further curing of the composition to produce the shaped article. For the rubber of the present example, a conventional hot-molding press on which is mounted a two-part mold pre-heated to a temperature from about 140° C. or about 200° C. was be used to shape the article, the latter being allowed to further cure under heat into the mold under pressure and then allowed to chill until mold removal temperature was attained. Pre-heating of the composition in the mixing stage followed by molding at a temperature well above minimum curing temperature has been found more energetically effective than known processes using one-step heating while shaping. Typically, curing is completed within about 60 min., which is more than twice faster than the curing time required by known one-step heating shaping processes. The humidity which remained in the molded batch was sufficiently reduced during mixing to ensure safe removal from the mold.

EXAMPLE 3

In this example, from about 40% to 90% by weight of cured rubber crumbs of either natural or synthetic type were previously pre-mixed with from about 0.1% to about 5% of a bonding agent, such as acrylic acid, Primacor 3460 (Dow Chemicals) a silane or a titanate, and are first introduced into 3 liter mixing chamber 32 of high intensity mixer 10. The rubber crumbs were selected to pass through a 20 mesh sieve. In a first step, the rotation speed of shaft 56 was maintained for about 30 sec to a value of about 3000 RPM corresponding to a blade tip speed of about 24 meter/s, to cause a substantially uniform distribution of the bonding agent through the rubber particles to form a coating. During that step, the temperature of the mix did not significantly raise. In a second step, a thermoplastic polymer resin selected from polyethylene (from low to high density) or ethyl-vinyl-acetates, from about 60 to about 10% by weight, was introduced into the mix, while shaft 56 was rotated at a speed set from about 2800 to about 3600 RPM, which correspond to a blade tip speed from about 22 to 29 meter/s, respectively. PLC 92 was programmed to monitor the temperature as previously explained, to command activation of discharge door 78 whenever a target discharge temperature was considered to have been reached, corresponding to a temperature for the mixed matter from about 160° C. to about 190° C. to yield a ready to shape matter exhibiting improved mechanical properties due to the bound rubber-thermoplastic matter as compared to material wholly made of cured rubber crumbs. The discharged material in a viscous state was then ready to be transferred to a shaping station to be formed into an article, using a cold molding press as explained before in conjunction with example 1.

EXAMPLE 4

In this example, from about 20% to 99% by weight of cured rubber crumbs of either natural or synthetic type were previously pre-mixed with from about 10% to 1% of a curing agent such as sulfur, with from about 80% to 1% of a low molecular weight polymeric binder which reacts with the curing agent, such as trans-polyoctenamer (supplied by Huls AG) with from about 40% to 1% of natural or synthetic uncured rubber such as a styrene-butadiene. Other polymeric binder such as styrene-1,4-butadiene, a copolymer of 1,4-butadiene and acrylonitrile or 1,2-polybutadiene may also be used. Known activators such as zinc oxide or stearic acid, and a curing accelerator such as tetramethyl thiuran disulfide (TMTD) or benzothiazyldisulfide (MBTS) were added to control curing of the uncured rubber. This pre-mix was then introduced into 3 liter mixing chamber 32 of the high intensity mixer 10. The rubber crumbs were selected to pass through a 20 mesh sieve. For the composition of the present example, the rotation speed of shaft 56 may be set from about 2200 to about 3600 RPM, which correspond to a blade tip speed from about 17 to 29 meter/s, respectively. PLC 92 can be programmed to monitor the temperature as previously explained, to command activation of discharge door 78 whenever a target discharge temperature was considered to have been reached, corresponding to a temperature for the mixed material from about 115° C. to about 140° C., at which temperature further curing is substantially prevented, thereby producing a rubber-based composition which can be later heat-shaped into an article. The discharged composition in the form of a mass of hot particles was then ready to be transferred to a shaping station to be shaped into an article, in the same manner as explained in conjunction with Example 2.

It is to be understood that any variant of the preferred embodiments described above should be considered within the ambit of the present invention, provided it falls within the scope of the appended claims.

What is claimed is:

1. Process for producing a batch of rubber-based composition capable of being heat-formed into a shaped article, comprising the steps of feeding a mixture of mixable materials consisting of from about 40% to about 98% by weight of said mixture of particles of cured rubber material, from about 1% to about 10% by weight of said mixture of a vulcanization agent, and from about 1% to about 40% by weight of said mixture of a polymeric binder which is reactive with said vulcanization agent, into a closed mixing chamber, mixing and thermokinetically heating the mixture of mixable materials, continuously monitoring one of temperature and temperature related parameter of the batch, discharging the batch from the mixing chamber when said one of temperature and temperature related parameter reaches a reference value ensuring a substantially uniform mix of said cured rubber material with said vulcanization agent and said polymeric binder without causing significant further vulcanization to produce said rubber-based composition.

2. Process according to claim 1, wherein said closed mixing chamber is provided on a high intensity mixer including a central shaft having mixing blades.

3. Process according to claim 2, which comprises rotating the shaft to provide a blade tip speed of from about 17 meter/s to about 35 meter/s under conditions effective to intensively mix and thermokinetically heat the batch of mixable materials.

4. Process according to claim 3, wherein the blade tip speed is from about 25 meter/s to about 30 meter/s.

5. Process for producing a shaped article made from a rubber-based material comprising the steps of feeding a mixture of mixable materials consisting of from about 40% to about 98% by weight of said mixture of particles of cured rubber material, from about 1% to about 10% by weight of said mixture of a vulcanization agent, and from about 1% to about 40% by weight of said mixture of a polymeric binder which is reactive with said vulcanization agent, into a closed mixing chamber, mixing and thermokinetically heating the mixture of mixable materials, continuously monitoring one of temperature and temperature related parameter of the batch, discharging the batch from the mixing chamber when said one of temperature and temperature related parameter reaches a reference value ensuring a substantially uniform mix of said cured rubber material with said vulcanization agent and said polymeric binder without causing significant further vulcanization to produce said rubber based composition, shaping the discharged batch of rubber based composition to produce said shaped article.

6. Process according to claim 5, wherein said closed mixing chamber is provided on a high intensity mixer including a central shaft having mixing blades.

7. Process according to claim 5, which comprises rotating the shaft to provide a blade tip speed of from about 17 meter/s to about 35 meter/s under conditions effective to intensively mix and thermokinetically heat the batch of mixable materials.

8. Process according to claim 7, wherein the blade tip speed is from about 25 meter/s to about 30 meter/s.

9. Process for producing a batch of rubber-based composition capable of being heat-formed into a shaped article, comprising the steps of feeding a mixture of mixable materials consisting of from about 40% to about 97% by weight of said mixture of particles of cured rubber material, about 1% to about 40% by weight of said mixture of virgin rubber, about 1% to about 10% by weight of said mixture of a vulcanizing agent, and about 1% to about 40% by weight of a polymerized binder which is reactive with said vulcanizing agent, into a closed mixing chamber, mixing and thermokinetically heating the mixture of mixable materials, continuously monitoring one of temperature and temperature related parameter of the batch, discharging the batch from the mixing chamber when said one of temperature and temperature related parameter reaches a reference value ensuring a substantially uniform mix of said cured rubber material with said vulcanization agent and said polymeric binder without causing significant further vulcanization to produce said rubber based composition.

10. Process according to claim 9, wherein said closed mixing chamber is provided on a high intensity mixer including a central shaft having mixing blades.

11. Process according to claim 10, which comprises rotating the shaft to provide a blade tip speed of from about 17 meter/s to about 35 meter/s under conditions effective to intensively mix and thermokinetically heat the batch of mixable materials.

12. Process according to claim 11, wherein the blade tip speed is from about 25 meter/s to about 30 meter/s.

13. Process for producing a shaped article made from a rubber-based material comprising the steps of feeding a mixture of mixable materials consisting of from about 40% to about 97% by weight of said mixture of particles of cured rubber material, about 1% to about 40% by weight of said mixture of virgin rubber, about 1% to about 10% by weight of said mixture of a vulcanizing agent, and about 1% to about 40% by weight of a polymerized binder which is reactive with said vulcanizing agent, into a closed mixing chamber, mixing and thermokinetically heating the mixture of mixable materials, continuously monitoring one of temperature and temperature related parameter of the batch, discharging the batch from the mixing chamber when said one of temperature and temperature related parameter reaches a reference value ensuring a substantially uniform mix of said cured rubber material with said vulcanization agent and said polymeric binder without causing significant further vulcanization to produce said rubber-based composition, shaping the discharged batch of rubber-based composition to produce said shaped article.

14. Process according to claim 13, wherein said closed mixing chamber is provided on a high intensity mixer including a central shaft having mixing blades.

15. Process according to claim 14, which comprises rotating the shaft to provide a blade tip speed of from about 17 meter/s to about 35 meter/s under conditions effective to intensively mix and thermokinetically heat the batch of mixable materials.

16. Process according to claim 1, wherein said polymeric binder is a low molecular weight polymeric binder.

17. Process according to claim 1, wherein said batch of mixable material further comprises at least one of a curing starting agent and a curing accelerator.

18. Process according to claim 15, wherein the blade tip speed is from about 25 meter/s to about 30 meter/s.

* * * * *